(12) United States Patent
Sellergren

(10) Patent No.: US 9,561,736 B2
(45) Date of Patent: Feb. 7, 2017

(54) VEHICLE COMPONENT COMPRISING SANDWICH STRUCTURE

(71) Applicant: VOLVO CAR CORPORATION, Gothenburg (SE)

(72) Inventor: Per-Ivar Sellergren, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 55 days.

(21) Appl. No.: 14/209,287

(22) Filed: Mar. 13, 2014

(65) Prior Publication Data

US 2014/0284124 A1 Sep. 25, 2014

(30) Foreign Application Priority Data

Mar. 20, 2013 (EP) ..................... 13160142

(51) Int. Cl.
*B60R 16/04* (2006.01)
*B60L 11/18* (2006.01)
*H01M 2/10* (2006.01)
*H01M 10/04* (2006.01)
*H01M 10/625* (2014.01)
*H01M 10/647* (2014.01)
(Continued)

(52) U.S. Cl.
CPC ........ *B60L 11/1879* (2013.01); *H01M 2/1072* (2013.01); *H01M 2/1083* (2013.01); *H01M 2/1094* (2013.01); *H01M 10/0413* (2013.01); *H01M 10/613* (2015.04); *H01M 10/625* (2015.04); *H01M 10/647* (2015.04); *H01M 10/6554* (2015.04); *H01M 10/0525* (2013.01); *H01M 10/0585* (2013.01); *Y02T 10/7005* (2013.01); *Y02T 10/705* (2013.01); *Y02T 10/7011* (2013.01); *Y02T 10/7016* (2013.01)

(58) Field of Classification Search
CPC ... B60R 16/04; B60K 1/04; B60K 2001/0433; B60K 2001/045; B60K 2001/0405; H01M 2/1072; H01M 2/1083
See application file for complete search history.

(56) References Cited

U.S. PATENT DOCUMENTS 4,255,485 A * 3/1981 Yau .................... C03C 25/28
156/335
5,567,544 A 10/1996 Lyman
(Continued)

FOREIGN PATENT DOCUMENTS

DE 19615096 9/1996
EP 1294032 3/2003
(Continued)

OTHER PUBLICATIONS

Extended European Search Report for EP 13160142.9, Dated Jul. 24, 2013, 7 Pages.
(Continued)

*Primary Examiner* — J. Allen Shriver, II
*Assistant Examiner* — Travis Coolman
(74) *Attorney, Agent, or Firm* — Brooks Kushman P.C.

(57) ABSTRACT

A vehicle component may include a sandwich structure having a first supporting sheet, a second supporting sheet, and an essentially planar electro-chemical battery. The essentially planar electro-chemical battery may be arranged between, and abutting against, the first and the second supporting sheets.

16 Claims, 2 Drawing Sheets

(51) Int. Cl.
*H01M 10/6554* (2014.01)
*H01M 10/613* (2014.01)
*H01M 10/0525* (2010.01)
*H01M 10/0585* (2010.01)

(56) References Cited

U.S. PATENT DOCUMENTS

| | | | | |
|---|---|---|---|---|
| 5,793,603 | A * | 8/1998 | Lyman | 361/503 |
| 6,248,262 | B1 * | 6/2001 | Kubotera | H01B 1/24 |
| | | | | 106/472 |
| 7,579,112 | B2 * | 8/2009 | Chiang et al. | 429/209 |
| 7,815,887 | B2 * | 10/2010 | Schafer | D04H 1/4242 |
| | | | | 264/29.2 |
| 8,470,417 | B2 * | 6/2013 | Mengel | 428/34.1 |
| 8,802,204 | B2 * | 8/2014 | Mengel | 428/34.1 |
| 9,023,508 | B2 * | 5/2015 | Seong et al. | 429/159 |
| 2003/0054239 | A1 | 3/2003 | Watanabe et al. | |
| 2006/0286450 | A1 | 12/2006 | Yoon et al. | |
| 2007/0014947 | A1 * | 1/2007 | Mengel | A23B 4/10 |
| | | | | 428/34.1 |
| 2012/0115020 | A1 * | 5/2012 | Hwang | 429/163 |
| 2012/0263984 | A1 | 10/2012 | Krammer | |
| 2013/0337304 | A1 | 12/2013 | Luski et al. | |
| 2014/0106193 | A1 * | 4/2014 | Kim et al. | 429/94 |
| 2015/0044536 | A1 * | 2/2015 | Kwon et al. | 429/94 |

FOREIGN PATENT DOCUMENTS

| | | |
|---|---|---|
| EP | 1452406 | 9/2004 |
| EP | 1632407 | 3/2006 |
| JP | 2004103258 | 4/2004 |
| JP | 2010083384 | 4/2010 |
| WO | 2012114162 | 8/2012 |

OTHER PUBLICATIONS

Extended European Search Report for European Application No. EP 13166222.3, Completed by the European Patent Office, Dated Oct. 1, 2013, 6 Pages.

* cited by examiner ately planar electro-chemical battery is arranged between, and abutting against, the first and the second supporting sheets, a vehicle component is provided,
VEHICLE COMPONENT COMPRISING SANDWICH STRUCTURE

CROSS-REFERENCE TO RELATED APPLICATIONS

This application claims foreign priority benefits under 35 U.S.C. §119(a)-(d) to European patent application number EP 13160142.9 filed Mar. 20, 2013, which is incorporated herein by reference in its entirety.

TECHNICAL FIELD

The present disclosure relates to a vehicle component comprising a sandwich structure. The present disclosure further relates to a vehicle comprising such a vehicle component.

BACKGROUND

There is a strong incentive to reduce vehicle emissions in the automotive industry. Traditionally, this has been done by improving fuel efficiency of combustion engines, reducing aerodynamic drag, reducing rolling resistance of vehicle tires, etc. In recent years, hybrid electric vehicles, at least partially being propelled by electric motors, as well as purely electrically propelled vehicles have found their way to market. The $CO_2$ emissions of such vehicles are substantial lower than the $CO_2$ emissions of vehicles solely being propelled by combustion engines. Also, hybrid electric vehicles and purely electrically propelled vehicles have the advantage of being able to store energy being produced during braking. Especially during city driving which is associated with a plurality of start and stop events, such energy storage has the potential of a significant reduction of $CO_2$ emissions. Even though hybrid electric vehicles and purely electrically propelled vehicles have advantages over traditional vehicles solely being propelled by combustion engines, they do have some drawbacks. Such a drawback is the accommodation of a bulky and heavy battery pack. For example, a battery pack of a purely electrically propelled vehicle can weigh as much as 450 kg. The weight of such a battery pack reduces the total energy efficiency of the vehicle, as well as the performance of the vehicle, both with regard to acceleration and cornering abilities. Further, such a battery pack requires a considerable amount of space inside the vehicle why areas such as the luggage compartment have to be adapted and reduced to accommodate the battery pack. In addition, such a battery pack requires a considerable amount of cooling during use. Therefore, battery packs of hybrid electric vehicles and purely electrically propelled vehicles are often provided with cooling systems such as fans, air-ducts and cooling boxes. Also, since overheating a battery pack is potentially dangerous, such a cooling system often has some sort of temperature monitoring and feedback system.

Attempts have been made to adapt existing vehicle parts such that these can be used to store electric energy. A rechargeable battery which is incorporated into a structural component is described in the document WO 2011098794 A1. Such component could be used as an energy storing unit which would overcome some of the above described drawbacks of battery packs. However, since the rechargeable battery described in the document is a capacitor type battery it has a low energy storage capacity and thereby has a limited potential to replace the battery pack of a hybrid electric or purely electrically propelled vehicle.

Therefore, in view of the above mentioned drawbacks with the prior art solutions, there is a need for a vehicle component which could be used as an energy storing unit with high energy storing potential.

SUMMARY

An object of the present disclosure is to provide a vehicle component which has a rigid structure and is suitable for use as an energy storing unit with high energy storing potential.

According to an aspect of the disclosure, the object is achieved by a vehicle component comprising a sandwich structure comprising a first supporting sheet and a second supporting sheet, wherein the sandwich structure further comprises an essentially planar electro-chemical battery arranged between, and abutting against, the first and the second supporting sheets.

Since the essentially planar electro-chemical battery is arranged between, and abutting against, the first and the second supporting sheets, a vehicle component is provided, which has a rigid structure and is useable as an energy storing unit with high energy storing potential.

As a result, the above mentioned object is achieved.

Further, since the vehicle component comprises a sandwich structure comprising a first supporting sheet, a second supporting sheet, and an essentially planar electro-chemical battery arranged between, and abutting against, the first and the second supporting sheets, the essentially planar electro-chemical battery, the first, and the second supporting sheets form discrete parts. Thus, the first and the second supporting sheets do not form an integral part of the essentially planar electro-chemical battery. Therefore, the vehicle component is easy to recycle as compared to the prior art solutions where a battery is incorporated into a structural component.

The vehicle component may be a component for an aircraft such as a body panel or a wing, or a component for a car, a truck, or a bus or the like, such as a body panel, a structural part of a vehicle chassis, a vehicle roof, a vehicle hood, a vehicle door, a vehicle trunk lid, a vehicle engine plenum cover, or a vehicle spare wheel box.

The first and second supporting sheets are arranged to support their own weight and the weight of the essentially planar electro-chemical battery. In addition, first and second supporting sheets may be arranged to support the weight of other components such as other vehicle components. Also, the first and second supporting sheets may be arranged to take up forces exerted on the vehicle component such as bending forces, pressure forces, etc.

According to some embodiments, the sandwich structure extends in a first, a second, and a third direction, where each direction is perpendicular to the other two directions, and an extension of the sandwich structure is substantially greater in a first and a second direction than in a third direction. For example, the extension of the sandwich structure may be more than ten times greater in the first and the second direction than in the third direction. Since an extension of the sandwich structure is substantially greater in a first and a second direction than in a third direction, the form of the sandwich structure facilitates cooling of the essentially planar electro-chemical battery.

According to some embodiments, the essentially planar electro-chemical battery comprises a thin film lithium ion battery or a thin film lithium polymer battery. Since the essentially planar electro-chemical battery, in these embodiments, comprises a thin film lithium ion battery or a thin film lithium polymer battery, the weight of the battery is low and the energy storage capability of the battery is good. Thereby, the energy storing potential of the vehicle component is further improved.

According to some embodiments, at least the first supporting sheet is arranged to conduct heat from the essentially planar electro-chemical battery to an ambient environment of the vehicle component. Since at least the first supporting sheet is arranged to conduct heat from the essentially planar electro-chemical battery to an ambient environment of the vehicle component in these embodiments, cooling of the essentially planar electro-chemical battery is ensured. Further, since the battery is essentially planar and since an extension of the sandwich structure may be substantially greater in a first and a second direction than in a third direction, the cooling capacity of the battery, through heat transfer from the battery via the first supporting sheet to an ambient environment of the vehicle component is improved.

According to some embodiments, the first and the second supporting sheets comprise a composite material such as carbon fiber composite, carbon net composite or glass fiber composite. Since the first and the second supporting sheets, in these embodiments, comprise a composite material such as carbon fiber composite, carbon net composite or glass fiber composite, the sandwich structure is strong and light weight, whereby the vehicle component, having energy storing capabilities, also is strong and light weight.

According to some embodiments, the first and the second supporting sheets are connected via at least one connection. Since the first and the second supporting sheets are connected via at least one connection, a rigid vehicle component is provided where shear forces between the first and second sheets may be transferred directly via the at least one connection.

According to some embodiments, the at least one connection is provided adjacent to the essentially planar electro-chemical battery. Since the least one connection is provided adjacent to the essentially planar electro-chemical battery, in these embodiments, a rigid vehicle component is provided and the connection is easy to form. Thereby manufacturing costs of the vehicle component may be reduced. Also, since the least one connection is provided adjacent to the essentially planar electro-chemical battery the component may be easy to recycle.

According to some embodiments, the essentially planar electro-chemical battery is provided with at least one through hole, and wherein the at least one connection is provided via the at least one through hole. Since the essentially planar electro-chemical battery is provided with at least one through hole, and the at least one connection is provided via the at least one through hole, a rigid vehicle component is provided where shear forces between the first and second sheets may be transferred directly via the at least one connection.

According to some embodiments, the component is one of a vehicle roof, a vehicle hood, a vehicle door, a vehicle trunk lid, a vehicle engine plenum cover, or a vehicle spare wheel box. Since the component, in these embodiments, is one of a vehicle roof, a vehicle hood, a vehicle door, a vehicle trunk lid, a vehicle engine plenum cover, or a vehicle spare wheel box, a vehicle component is provided having energy storing capabilities which may replace an existing vehicle component. Also, since the energy storing potential of the vehicle component is high, the use of one or more of such components in a vehicle reduces the need for additional heavy and bulky battery packs and/or lead-acid batteries. Therefore, in total, the weight of a vehicle comprising one or more of such components may be reduced.

A further object of the disclosure is to provide a vehicle comprising a vehicle component which has a rigid structure and is suitable for use as an energy storing unit with high energy storing potential. According to an aspect of the disclosure, the object is achieved by a vehicle, wherein the vehicle comprises a vehicle component at least comprising a sandwich structure comprising a first supporting sheet, a second supporting sheet, and an essentially planar electro-chemical battery arranged between, and abutting against, the first and the second supporting sheets.

Since the essentially planar electro-chemical battery is arranged between, and abutting against, the first and the second supporting sheets, a vehicle comprising a vehicle component is provided, which has a rigid structure and is useable as an energy storing unit with high energy storing potential. As a result, the above mentioned object is achieved.

Further features of, and advantages with, the present disclosure will become apparent when studying the appended claims and the following detailed description. Those skilled in the art will realize that different features of the present disclosure may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

The present disclosure will now be described more fully with reference to the accompanying drawings, in which example embodiments are shown. However, this disclosure should not be construed as limited to the embodiments set forth herein. Disclosed features of example embodiments may be combined as readily understood by one of ordinary skill in the art to which this disclosure belongs. Like numbers refer to like elements throughout. Well-known functions or constructions will not necessarily be described in detail for brevity and/or clarity.

Figure 1:
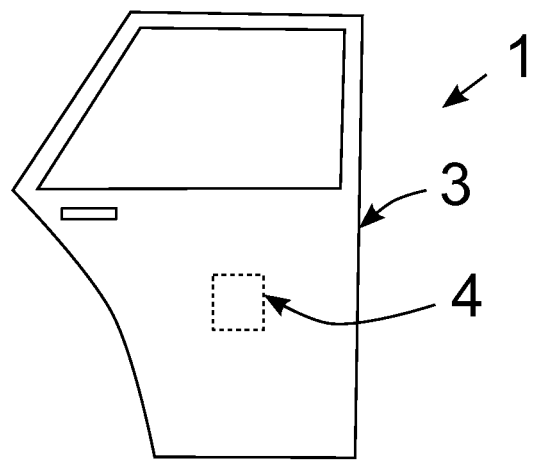
FIG. 1 illustrates a vehicle component according to some embodiments.
Figure 2A:
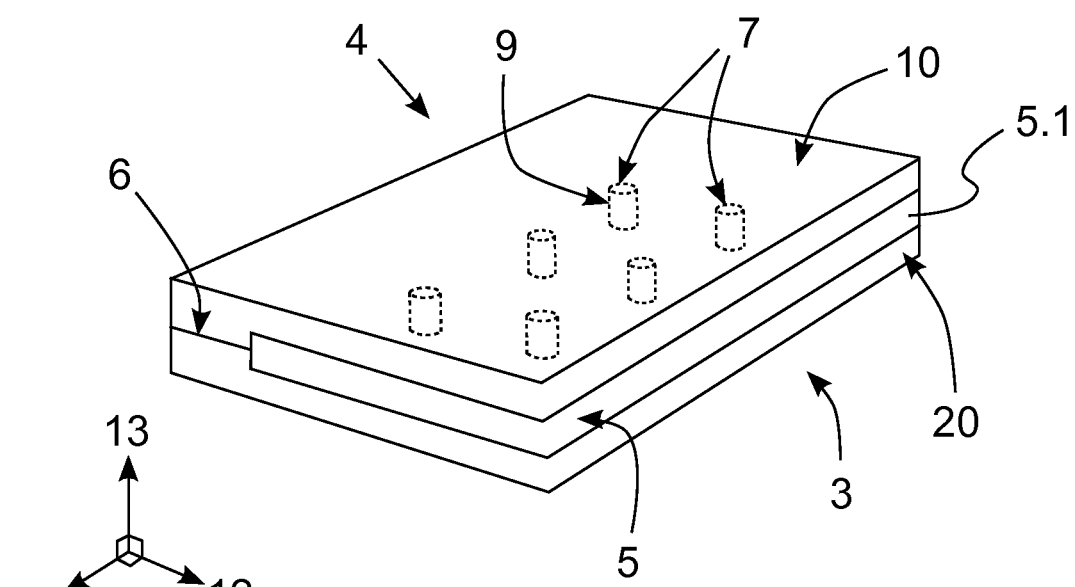
FIGS. 2a and 2b illustrates a sandwich structure of a vehicle component according to some embodiments.

FIG. 1 illustrates a vehicle component 1 comprising a sandwich structure 3. The vehicle component 1 is illustrated as a vehicle door. The entire vehicle component 1 or a larger portion of the vehicle component 1 may be provided with the sandwich structure. In FIG. 1, a segment 4 of the vehicle component 1 comprising the sandwich structure 3 is illustrated. The segment 4 is also illustrated in FIG. 2a. As can be seen, the sandwich structure 3 comprises a first supporting sheet 10, a second supporting sheet 20, and an essentially planar electro-chemical battery 5 arranged between, and abutting against, the first and the second supporting sheets 10, 20. Thereby, a rigid structure is provided and the component 1 can be used as an energy storing unit with high energy storing potential. The sandwich structure 3 extends in a first, a second, and a third direction 11, 12, 13, where each direction 11, 12, 13 is perpendicular to the other two directions, and an extension of the sandwich structure 3 is substantially greater in the first and the second direction 11, 12 than in the third direction 13. Thereby, the form of the sandwich structure 3 facilitates cooling of the essentially planar electro-chemical battery 5.

According to some embodiments, the sandwich structure 3 may extend in a first and a second direction 11, 12, where the first and/or the second directions 11, 12 are curved, and wherein an extension of the sandwich structure 3 is substantially greater in the first and the second direction 11, 12 than in the third direction 13. In these embodiments, since the essentially planar electro-chemical battery is comprised in the sandwich structure 3, the essentially planar electro-chemical battery may be curved as well. Thus, according to some embodiments, the vehicle component 1 may be curve-shaped, circularly shaped, or may have any other shape as long as an extension of the sandwich structure 3 of the component 1 is substantially greater in a first and the second direction 11, 12 than in the third direction 13.

The entire vehicle component 1 or a larger portion of the vehicle component 1 may be provided with the sandwich structure 3, which sandwich structure 3 may comprise one coherent essentially planar electro-chemical battery 5 which may cover a majority of the sandwich structure 3. As an alternative to one coherent essentially planar electro-chemical battery, the sandwich structure 3 may comprise a plurality of essentially planar electro-chemical batteries 5 being arranged side by side between the first and second supporting sheets. In these embodiments, the plurality of essentially planar electro-chemical batteries 5 is interconnected by electrical wiring. In all embodiments however, the vehicle component 1 comprises electrical connections via which an electrical current may be delivered to, or received from, the essentially planar electro-chemical battery 5. Such electrical connections may comprise point connections and/or ribbon connectors, which may be arranged along an edge of the essentially planar electro-chemical battery 5.

The essentially planar electro-chemical battery 5 may comprise a thin film lithium ion battery or a thin film lithium polymer battery. Since a thin film lithium ion battery or a thin film lithium polymer battery has a low weight and a good energy storing potential, the energy storing potential of the vehicle component 1 is further ensured. Also, during use, a thin film lithium ion battery or a thin film lithium polymer battery requires cooling. Since the form of the sandwich structure 3 facilitates cooling, the cooling of such a thin film lithium ion battery or a thin film lithium polymer battery is ensured.

Figure 2B:
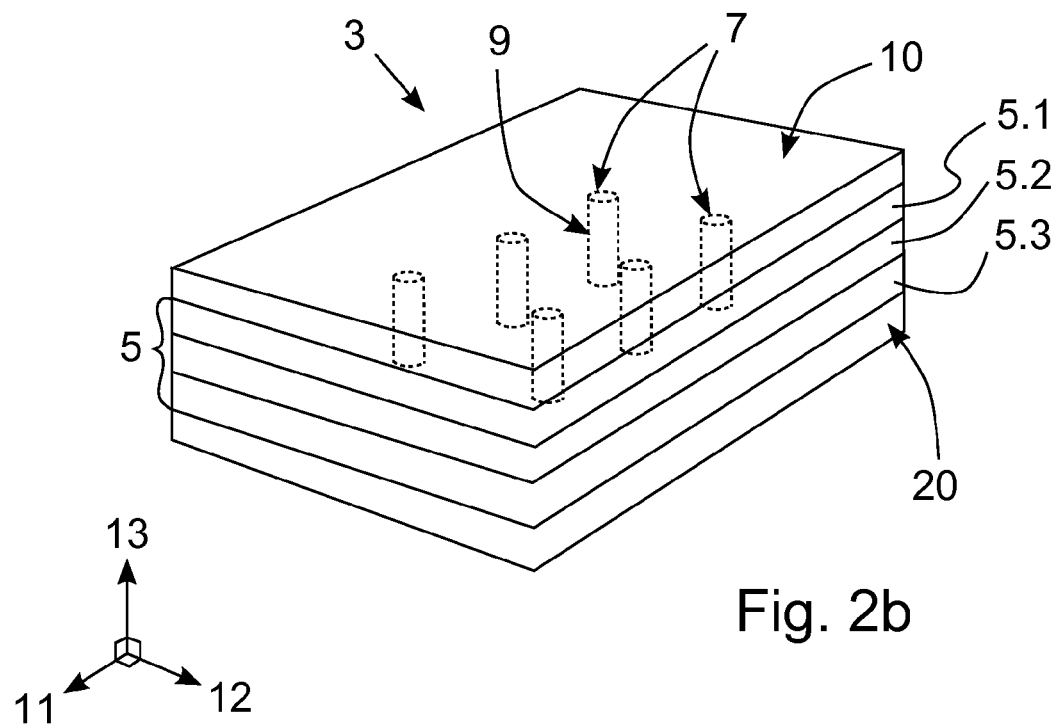

The essentially planar electro-chemical battery 5 may comprise one or more essentially planar electro-chemical battery cells 5.1. In FIG. 2a, the essentially planar electro-chemical battery 5 is illustrated as comprising one essentially planar electro-chemical battery cell 5.1. By the sandwich structure 3 comprising one essentially planar electro-chemical battery cell 5.1 arranged between, and abutting against, the first and the second supporting sheets 10, 20, a thin sandwich structure 3 may be provided. In FIG. 2b, the essentially planar electro-chemical battery 5 is illustrated as comprising three essentially planar electro-chemical battery cells 5.1, 5.2, 5.3. The three essentially planar electro-chemical battery cells 5.1, 5.2, 5.3 are stacked and bonded to each other so as to form the essentially planar electro-chemical battery 5. By using more than one essentially planar electro-chemical battery cell, the energy storing potential may be further improved. The essentially planar electro-chemical battery 5 may comprise more than three essentially planar electro-chemical battery cells, such as four, five, six, or seven essentially planar electro-chemical battery cells, as long as the cells together form an essentially planar electro-chemical battery, i.e. that an extension of the essentially planar electro-chemical battery is substantially greater in a first and a second direction than in a third direction where each direction is perpendicular to the other two directions.

The first and the second supporting sheets 10, 20 may comprise a composite material such as carbon fiber composite, carbon net composite or glass fiber composite. The composite material may comprise carbon fibres, carbon nets, sheets of graphene, carbon nanotubes, or glass fibres as well as other fibres, such as aramid e.g. Kevlar, Twaron, or aluminium, and a binder such as a plastic, a polymer such as epoxy, polyester, vinyl ester or nylon. In embodiments wherein the first and the second supporting sheets 10, 20 comprises a composite material such as carbon fiber composite, carbon net composite or glass fiber composite, the fibres may be woven as a mat, laid as unidirectional fibres or be arranged as a net structure. Due to the first and the second supporting sheets 10, 20 comprising a composite material, the sandwich structure 3 is strong and light weight, whereby the vehicle component 1, having energy storing capabilities, also is strong and light weight. Therefore, by using such a vehicle component 1 in a vehicle, the total weight of the vehicle can be reduced.

At least the first supporting sheet 10 may be arranged to conduct heat from the essentially planar electro-chemical battery 5 to an ambient environment of the vehicle component 1. For the purpose of conducting heat the first supporting sheet 10 may be thin, i.e. having substantially smaller extension in the third direction 13 than in the first and the second direction 11, 12, and/or may be provided in a material and/or composite material composition having good thermal conductivity. Also, the first supporting sheet 10 may be arranged to conduct heat from the essentially planar electro-chemical battery 5 to an ambient environment of the vehicle component 1 by the first supporting sheet 10 being arranged adjacent to an external environment of the vehicle component 1 and of a corresponding vehicle.

According to some embodiments, the first and the second supporting sheets 10, 20 are connected via at least one connection 6, 9. Due to the at least one connection 6, 9 a rigid vehicle component 1 is provided and shear forces between the first and second sheets 10, 20 may be transferred via the at least one connection 6, 9. Some shear forces between the first and second sheets 10, 20 may also be transferred via the essentially planar electro-chemical battery 5. The at least one connection 6, 9 may comprise a bolt, a rivet, a spar, and/or glue. However, in embodiments wherein first and the second supporting sheets 10, 20 comprise a composite material such as carbon fiber composite, carbon net composite or glass fiber composite, the binder of the composite material of the respective first and the second supporting sheets 10, 20 may meet and bond where the bond forms the at least one connection 6, 9 between the first and the second supporting sheets 10, 20. Thereby, a uniform sandwich structure 3 is provided having flat surfaces and a rigid structure.

According to some embodiments, the at least one connection 6 is provided adjacent to the essentially planar electro-chemical battery 5. Thereby, the at least one connection 6 is easy to manufacture. Also, since the least one connection is provided adjacent to the essentially planar electro-chemical battery the vehicle component 1 may be easy to recycle. In FIG. 2a, the at least one connection 6 is illustrated as being provided adjacent to the essentially planar electro-chemical battery 5. The at least one connection 6 is illustrated in FIG. 2a may comprise glue or a bond between the binders of the composite materials of the respective first and the second supporting sheets 10, 20.

According to some embodiments, the essentially planar electro-chemical battery 5 is provided with at least one through hole 7, wherein the at least one connection 9 is provided via the at least one through hole 7. As indicated in FIG. 2a and FIG. 2b, the essentially planar electro-chemical battery 5 may be provided with a plurality of through holes 7, where the at least one connection 9 is provided via the plurality of through holes 7. In embodiments where the essentially planar electro-chemical battery 5 comprises two or more essentially planar electro-chemical battery cells 5.1, 5.2, 5.3, as illustrated in FIG. 2b, the through hole 7 may extend through all essentially planar electro-chemical battery cells 5.1, 5.2, 5.3. Due to the connection 9 via the at least on through hole 7, a rigid vehicle component 1 is provided and shear forces between the first and second sheets 10, 20 may be transferred via the at least one connection 9. In embodiments wherein first and the second supporting sheets 10, 20 comprise a composite material such as carbon fiber composite, carbon net composite or glass fiber composite, the binders of the composite material of the respective first and second sheets 10, 20 may extend through the at least one through hole 7 and meet to thereby form a bond where the bond forms the at least one connection 9 between the first and the second supporting sheets 10, 20. Thereby, a uniform sandwich structure 3 is provided having flat surfaces and a rigid structure.

Figure 3:
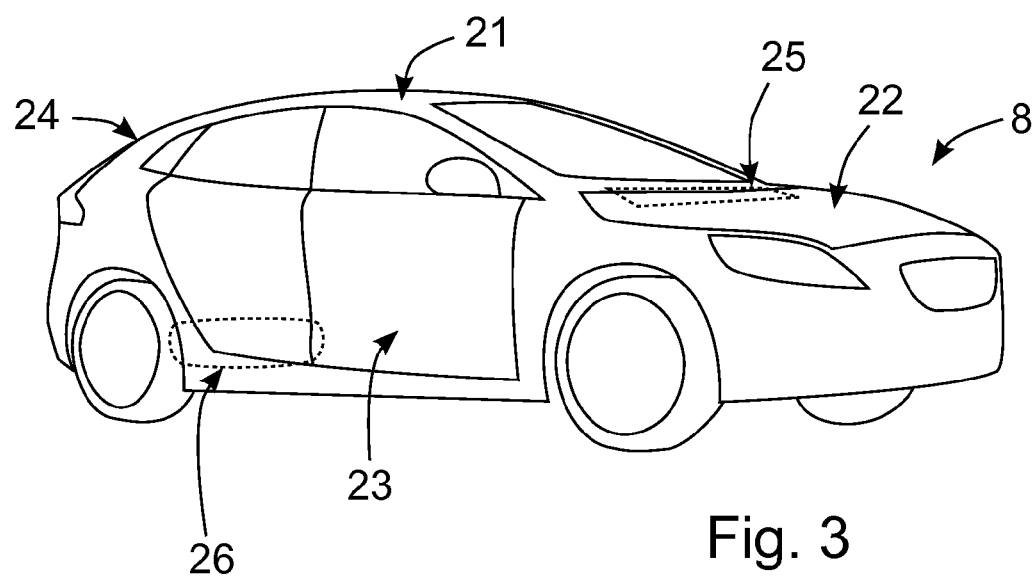
FIG. 3 illustrates a vehicle comprising a vehicle component according to some embodiments.

FIG. 3 illustrates vehicle 8 comprising vehicle components 21, 22, 23, 24, 25, 26 according to some embodiments. Each of the vehicle components 21, 22, 23, 24, 25, 26 comprises a sandwich structure comprising a first supporting sheet, a second supporting sheet, and an essentially planar electro-chemical battery arranged between, and abutting against, the first and the second supporting sheets. Since the essentially planar electro-chemical battery is arranged between, and abutting against, the first and the second supporting sheets, a vehicle component is provided, which has a rigid structure and is useable as an energy storing unit with high energy storing potential. Due to the components having rigid structures and high energy storing potential, the components may be provided in the form of a vehicle roof 21, a vehicle hood 22, a vehicle door 23, a vehicle trunk lid 24, a vehicle engine plenum cover 25, or a vehicle spare wheel box 26. By arranging one or more of such components in a vehicle, the need for heavy and bulky battery packs and/or lead-acid batteries is reduced. Thereby, the total weight of a hybrid electric vehicle or purely electrically propelled vehicle may be reduced whereby the $CO_2$ emissions of such a vehicle may be reduced. Also, since such solution occupies less internal space of the vehicle than battery packs and/or lead-acid batteries, the internal space of such a vehicle may be enlarged. The first supporting sheet of such components 21, 22, 23, 24, 25, 26 may be arranged adjacent to an ambient environment of the vehicle. Thereby, cooling of the essentially planar electro-chemical battery comprised in such components 21, 22, 23, 24, 25, 26 may be ensured.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle component comprising:
a sandwich structure comprising a first supporting sheet and a second supporting sheet, wherein the first and the second supporting sheets comprise a composite material having binders;
wherein the sandwich structure further comprises an essentially planar electro-chemical battery arranged between, and abutting against, the first and the second supporting sheets, and wherein the first and second supporting sheets meet and are connected via at least one connection, the essentially planar electro-chemical battery is provided with at least one through hole, and the at least one connection is provided via the at least one through hole, and wherein the binders of the composite material of the first and second supporting sheets extend through and fill the at least one through hole and meet to form a bond, the bond forming the at least one connection, the sandwich structure thereby having substantially flat surfaces.

2. The vehicle component according to claim 1 wherein the sandwich structure extends in a first, a second, and a third direction, where each direction is perpendicular to the other two directions, and an extension of the sandwich structure is substantially greater in the first and the second direction than in the third direction.

3. The vehicle component according to claim 1 wherein the essentially planar electro-chemical battery comprises a thin film lithium ion battery or a thin film lithium polymer battery.

4. The vehicle component according to claim 1 wherein at least the first supporting sheet is arranged to conduct heat from the essentially planar electro-chemical battery to an ambient environment of the vehicle component.

5. The vehicle component according to claim 1 wherein the first and the second supporting sheets comprise a carbon fiber composite, a carbon net composite or a glass fiber composite.

6. The vehicle component according to claim 1 wherein the component is one of a vehicle roof, a vehicle hood, a vehicle door, a vehicle trunk lid, a vehicle engine plenum cover, or a vehicle spare wheel box.

7. The vehicle component according to claim 1 wherein the at least one connection is provided adjacent to the essentially planar electro-chemical battery.

8. A vehicle comprising a vehicle component according to claim 1.

9. A vehicle component comprising:
a first supporting sheet comprising a composite material having binders;
a second supporting sheet comprising a composite material having binders; and an essentially planar electro-chemical battery for arrangement between the first and the second supporting sheets;

wherein the first and second supporting sheets meet and are connected via at least one connection, the essentially planar electro-chemical battery is provided with at least one through hole, and the at least one connection is provided via the at least one through hole, and wherein the binders of the composite material of the first and second supporting sheets extend through and fill the at least one through hole and meet to form a bond, the bond forming the at least one connection, the component thereby having substantially flat surfaces.

10. The vehicle component according to claim 9 wherein the first supporting sheet, the second supporting sheet, and the essentially planar electro-chemical battery form a sandwich structure, the essentially planar electro-chemical battery abutting against the first and the second supporting sheets, and wherein the sandwich structure extends in first, second, and third directions, where each direction is perpendicular to the other two directions, and an extension of the sandwich structure is substantially greater in each of the first and the second directions than in the third direction.

11. The vehicle component according to claim 9 wherein the essentially planar electro-chemical battery comprises a thin film lithium ion battery or a thin film lithium polymer battery.

12. The vehicle component according to claim 9 wherein at least the first supporting sheet is arranged to conduct heat from the essentially planar electro-chemical battery to an ambient environment of the vehicle component.

13. The vehicle component according to claim 9 wherein the first and the second supporting sheets comprise a carbon fiber composite, a carbon net composite or a glass fiber composite.

14. The vehicle component according to claim 9 wherein the component is one of a vehicle roof, a vehicle hood, a vehicle door, a vehicle trunk lid, a vehicle engine plenum cover, or a vehicle spare wheel box.

15. The vehicle component according to claim 9 wherein the at least one connection is provided adjacent to the essentially planar electro-chemical battery.

16. A vehicle comprising a vehicle component according to claim 9.

* * * * *